US012689316B2

(12) United States Patent
Beckhoff et al.

(10) Patent No.: US 12,689,316 B2
(45) Date of Patent: Jul. 21, 2026

(54) METHOD FOR OPERATING A PLANAR DRIVE SYSTEM AND PLANAR DRIVE SYSTEM

(71) Applicant: Beckhoff Automation GmbH, Verl (DE)

(72) Inventors: Johannes Beckhoff, Schloß Holte-Stukenbrock (DE); Felix Schulte, Rietberg (DE); Jan Achterberg, Duisburg (DE); Uwe Prüßmeier, Lemgo (DE); Lukas Bentfeld, Delbrück (DE)

(73) Assignee: Beckhoff Automation GmbH, Verl (DE)

( * ) Notice: Subject to any disclaimer, the term of this patent is extended or adjusted under 35 U.S.C. 154(b) by 149 days.

(21) Appl. No.: 18/638,344

(22) Filed: Apr. 17, 2024

(65) Prior Publication Data

US 2024/0266979 A1 Aug. 8, 2024

Related U.S. Application Data

(63) Continuation of application No. PCT/EP2022/079096, filed on Oct. 19, 2022.

(30) Foreign Application Priority Data

Oct. 19, 2021 (DE) ..................... 10 2021 127 039.1

(51) Int. Cl.
*H02P 25/064* (2016.01)
*H02K 41/03* (2006.01)

(52) U.S. Cl.
CPC ......... *H02P 25/064* (2016.02); *H02K 41/031* (2013.01); *H02K 2201/18* (2013.01)

(58) Field of Classification Search
CPC ..... H02P 25/064; H02P 6/006; H02K 41/031; H02K 2201/18; G06F 3/011; G06F 3/03543; G06F 3/03548; G06F 2203/012
See application file for complete search history.

(56) References Cited

U.S. PATENT DOCUMENTS 6,835,941 B1 12/2004 Tanaka
8,281,888 B2 10/2012 Bergmann
(Continued)

FOREIGN PATENT DOCUMENTS

CN 101779368 A 7/2010
CN 104798178 A 7/2015
(Continued)

OTHER PUBLICATIONS

Office Action dated Feb. 27, 2025 in connection with Chinese patent application No. 202280070533.X, 14 pages including English translation.

(Continued)

*Primary Examiner* — Bickey Dhakal
(74) *Attorney, Agent, or Firm* — Dorsey & Whitney LLP

(57) ABSTRACT

A planar drive system includes a stator module and a rotor. The stator module has a stator assembly with at least one coil arrangement that can be energized to generate a stator magnetic field above a stator surface, and a magnetic field sensor. The rotor has a magnet arrangement and can be moved above the stator surface via interaction between the stator magnetic field the magnet arrangement. The rotor can be used as an input device or output device, or both. A controller can compare the position of the rotor magnetic field detected with the sensor to the position expected based on energization of the coil arrangement, to determine any deviation of the expected position as an external movement, and to recognize an input thereby. The controller can control (Continued)

an output via a predetermined movement of the rotor, and to energize the coil arrangement so the rotor moves as defined.

16 Claims, 11 Drawing Sheets

(56)                    References Cited

U.S. PATENT DOCUMENTS

| | | | |
|---|---|---|---|
| 10,133,194 B2 | 11/2018 | Shibazaki | |
| 10,474,044 B2 | 11/2019 | Shibazaki | |
| 11,037,714 B2 | 6/2021 | Frangen | |
| 11,146,160 B2 | 10/2021 | Frangen | |
| 11,430,683 B2 | 8/2022 | Raatz et al. | |
| 11,437,902 B2 | 9/2022 | Brinkmann et al. | |
| 12,040,675 B2 * | 7/2024 | Luthe | H02P 5/00 |
| 2004/0126907 A1 | 7/2004 | Korenaga | |
| 2004/0257027 A1 * | 12/2004 | Matsuo | H02P 21/26 |
| | | | 318/722 |
| 2007/0046221 A1 | 3/2007 | Miyakawa | |
| 2014/0265690 A1 | 9/2014 | Henderson | |
| 2019/0348898 A1 * | 11/2019 | Frangen | H02K 11/21 |
| 2021/0328493 A1 | 10/2021 | Luthe et al. | |

FOREIGN PATENT DOCUMENTS

| | | | |
|---|---|---|---|
| CN | 110073589 A | 7/2019 | |
| CN | 111903045 A | 11/2020 | |
| CN | 112236851 A | 1/2021 | |
| DE | 102016224951 A1 | 6/2018 | |
| DE | 102017131304 A1 | 6/2019 | |
| DE | 102018006259 A1 | 12/2019 | |
| DE | 102018129731 A1 * | 5/2020 | ........... H02K 41/031 |
| EP | 2905804 A1 | 8/2015 | |
| EP | 3582386 B1 | 10/2021 | |
| WO | 2020109274 A1 | 6/2020 | |

OTHER PUBLICATIONS

International Preliminary Report on Patentability dated Aug. 25, 2023 for International Patent Application No. PCT/EP2022/079096, 18 pages including English translation.

International Search Report and Written Opinion for International Patent Application No. PCT/EP2022/079096, Feb. 13, 2023, 28 pages including English translation.

Office action for German patent application No. 10 2021 127 039.1, Jul. 28, 2022, 12 pages including English translation.

Perlin, Ken et al. "Madgets: actuating widgets on interactive table-tops," ACM UIST Oct. 3, 2010, RWTH Aachen University, Germany, pp. 293-30.

English Translation of German patent publication DE102018129731A1, dated May 28, 2020, 44 pages.

* cited by examiner

METHOD FOR OPERATING A PLANAR DRIVE SYSTEM AND PLANAR DRIVE SYSTEM

CROSS-REFERENCE TO RELATED APPLICATIONS

This patent application is a continuation of International Patent Application PCT/EP2022/079096, filed Oct. 19, 2022, entitled "Method for operating a Planar Drive System, and Planar Drive System," which claims the priority of German patent application DE 10 2021 127 039.1, filed Oct. 19, 2021, entitled "Verfahren zum Betreiben eines Planarantriebssystems und Planarantriebssystem," each of which is incorporated by reference herein, in the entirety and for all purposes.

FIELD

The invention relates to a method for operating a planar drive system and to a planar drive system.

BACKGROUND

Planar drive systems may be used, among other things, in automation technology, particularly in manufacturing technology, handling technology and process engineering. Planar drive systems may be used to move or position a moving element of a system or of a machine in at least two linearly independent directions. Planar drive systems may comprise a permanently energized electromagnetic planar motor comprising a planar stator and a rotor movable on the stator in at least two directions.

In a permanently energized electromagnetic planar motor, a driving force is exerted upon the rotor by the fact that energized coil arrangements of a stator assembly magnetically interact with driving magnets of a plurality of magnet arrangements of the rotor. Planar drive systems having rectangular and elongated coil arrangements and rectangular and elongated magnet arrangements of the rotor are known from the prior art. Such a planar drive system is described, for example, in publication DE 10 2017 131 304 A1. With the aid of such a planar drive system, in particular a linear and translational movement of the rotor is allowed for. This means that with the aid of such a planar drive system, the rotor may be moved freely in parallel to the stator surface above a stator surface under which the rectangular and elongated coil arrangements are arranged, and may be moved perpendicularly with regard to the stator surface at least at different distances from the stator surface. Furthermore, such a planar drive system is capable of tilting the rotor by a few degrees and rotating it by a few degrees. The latter movements may be carried out above arbitrary points of the stator surface. In particular, the rotor may be rotated by up to 20° from a normal position.

A controller is used to control such a planar drive system. It converts predetermined trajectories of the rotors into current information for the coil arrangements and then controls the energization of the coil arrangements. Actual positions of the rotors determined with the aid of position sensors may be used to control the currents of the coil arrangements. Inputs to the planar drive system and outputs from the planar drive system are provided by the controller. For example, the controller may comprise a user interface such as a keyboard, a computer mouse, and a display screen for inputting and outputting information.

SUMMARY

According to an aspect, a method operates a planar drive system, the planar drive system comprising at least a stator module and a rotor, the stator module comprising at least a stator assembly having at least a coil arrangement, and the coil arrangement is energized and is set up to generate a stator magnetic field above a stator surface due to an energization. The stator module comprises at least a magnetic field sensor, where the rotor comprises a magnet arrangement and is moved above the stator surface with the aid of an interaction between the stator magnetic field and a rotor magnetic field of the magnet arrangement.

The rotor can be used as an input device, where an input is detected by detecting a position of the rotor magnetic field with the aid of the magnetic field sensor and comparing it to a position expected on the basis of an energization of the coil arrangements, and where a deviation of the position from the expected position is determined as an external movement. Alternatively, the rotor can be used as an output device, where an output is provided via a predetermined movement of the rotor, where the coil arrangements are energized in such a way that the rotor moves as defined by the predetermined movement.

According to another aspect, a method operates a planar drive system, the planar drive system comprising at least a stator module and a rotor, the stator module comprising at least a stator assembly having at least one coil arrangement, the coil arrangement being capable of being energized and being set up to generate a stator magnetic field above a stator surface due to an energization. The rotor comprises a magnet arrangement and is moved above the stator surface with the aid of an interaction between the stator magnetic field and a rotor magnetic field of the magnet arrangement.

The rotor can be used as an input device, the stator module comprising at least a magnetic field sensor, the magnetic field sensor detecting the rotor magnetic field in order to determine the position of the rotor. An input is detected in that a position of the rotor expected on the basis of a energization of the coil arrangements to a detected position of the rotor is compared, and a deviation of the position from the expected position is evaluated as a position drag error and detected over time. Alternatively, an input is detected that the amount of an additional energization of the coil arrangements, which is carried out in order to maintain the position of the rotor to be expected due to the energization of the coil arrangements, is determined and evaluated as an external force and detected over time, where the position drag error and/or the external force is evaluated as an external movement in combination with the respective time duration and is assigned to a predetermined input event.

According to another aspect, a planar drive system comprises at least a stator module and a rotor, where the stator module comprises at least a stator assembly with at least a coil arrangement, where the coil arrangement is energized and is set up to generate a stator magnetic field above a stator surface due to an energization, and where the stator module comprises at least one magnetic field sensor. The rotor comprises a magnet arrangement and is moved above the stator surface with the aid of an interaction between the stator magnetic field and a rotor magnetic field of the magnet arrangement.

The rotor can be used as an input device and/or as an output device. A controller is set up to compare a position of the rotor magnetic field detected with the aid of the magnetic field sensor to a position expected on the basis of an energization of the coil arrangements, and to determine a deviation of the position from the expected position as an external movement and thereby to recognize an input. Alternatively, the controller is arranged to control an output via a predetermined movement of the rotor and, for this purpose, to energize the coil arrangements in such a way that the rotor moves as defined by the predetermined movement.

EXAMPLES

A planar drive system comprises at least one stator module and a rotor, where the stator module comprises at least one stator assembly with at least one coil arrangement. The coil arrangement may be energized and is configured to generate a stator magnetic field above a stator surface in response to an energization. The stator module further comprises at least one magnetic field sensor. The rotor comprises a magnet arrangement that may be moved above the stator surface with the aid of an interaction between the stator magnetic field and a rotor magnetic field of the magnet arrangement.

The rotor may further be used as an input device and/or as an output device. A controller is arranged to compare a position of the rotor magnetic field detected with the aid of the magnetic field sensor with a position expected based on an energization of the coil arrangements, and to detect a deviation of the position from the expected position as an external movement, thereby detecting an input. As an alternative or in addition, the controller is set up to control an output via a predetermined movement of the rotor and, for this purpose, to energize the coil arrangements in such a way that the rotor moves as defined by the predetermined movement.

The rotor of the planar drive system thus serves as an input device and/or as an output device. If the planar drive system is used in automation technology, in particular manufacturing technology, handling technology and process engineering, persons operating and/or monitoring the planar drive system may carry out their task more easily. For example, persons without knowledge of programming the controller may change the movement of the rotor or provide input to the controller using rotor movements. This means, for example, that programming aids for the controller may be dispensed with, that short-term adjustments may be made in a production sequence, or that transport services may be provided as required. Furthermore, outputs may be made directly by the rotor so that monitoring of a screen is not necessary and a glance does not have to be averted from the planar drive system.

An input device for a controller of a planar drive system serves, for example, for transmitting control commands for controlling the planar drive system, in particular for controlling the movement of the rotor, from a machine operator to the controller. Input devices in the form of computer keyboards, computer mice, touch displays or the like are known from the prior art.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
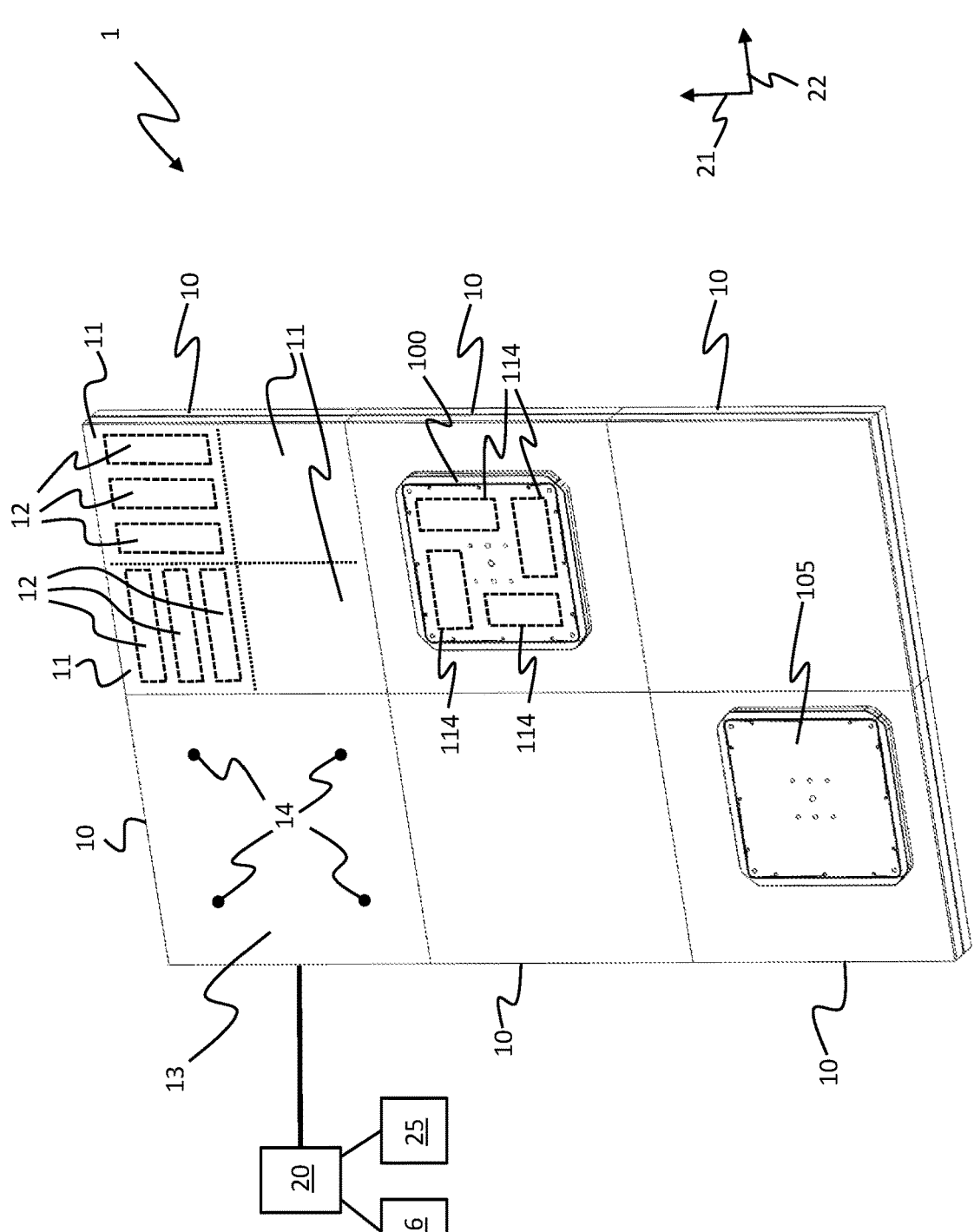
FIG. 1 shows a planar drive system.

In the following, the same reference numerals may be used for the same features. Furthermore, for reasons of clarity, it may be provided that not all elements are shown in each figure. Furthermore, for the sake of clarity, it may be provided that not every element is provided with its own reference numeral in every drawing.

According to the invention, it may particularly be provided that an input to the controller takes place with the aid of the rotor as an input device. An output device for a controller of a planar drive system serves, for example, for transmitting state or process information of the control of the planar drive system, in particular with respect to the control of the movement of the rotor, from the controller to a machine operator. Output devices in the form of computer screens, light signals or the like are known from the prior art.

According to the invention, an output from the controller may be provided via the rotor as an output device. Thus, the rotor of the planar drive system may be used for human-machine communication or machine-human communication. The rotor may detect signals from its environment, in particular haptic signals possibly generated by a machine operator, for example in the form of tapping the rotor. In this case, the rotor serves as an input device for human-machine communication, allowing for a flow of information to take place from the human to the machine. Similarly, the rotor may also be used to output information, such as status information, allowing for a flow of information to take place from the machine to the human. In doing so, the rotor may carry out certain movements in order to communicate a status to the machine operator. In addition, the rotor may be provided with further actuators, for example illuminants, which additionally or alternatively allow for an information output. The rotor is therefore also an output device for machine-human communication.

The deviation of the position from the expected position may thereby comprise a position drag error, i.e. a real deviation of the position. Furthermore, the deviation of the position from the expected position may be used alternatively or additionally in order to calculate an external force acting upon the rotor if the rotor is held in position with the aid of the coil arrangements and an additional current is applied to the coil arrangements due to the external movement in order to maintain the position. Conclusions about the external force may then be drawn from the amount of current applied.

According to the invention, a method for operating the planar drive system in which the rotor may be used as an input device is implemented as follows. An input is detected by detecting a position of the rotor magnetic field with the aid of the magnetic field sensor and comparing it with a position expected based on a current flow in the coil arrangements. A deviation of the position from the expected position is detected as an external movement.

A deviation of the position from the expected position is typically due to the fact that the rotor has been moved within the planar drive system, where no current has been applied to the coil arrangements causing this. Thus, this may be recognized as an input and further functions of the planar drive system may be controlled based on the input.

In an embodiment of the method, a movement parallel to the stator surface is detected when comparing the position and the expected position. Thus, the input may be carried out in such a way that the rotor is moved in parallel to the stator surface. For example, a movement in a direction parallel to the stator surface may be used to trigger a movement of the rotor in this direction, in that it follows on the basis of the input that the rotor is to be moved in this direction with the aid of the coil arrangements. The movement parallel to the stator surface thereby results in a first input option.

In an embodiment of the method, a movement perpendicular to the stator surface is detected when comparing the position and the expected position. This may be used, for example, to determine that the rotor should initially not be moved further and only after a second movement, which is identified as an input, perpendicular to the stator surface is the rotor released again and moved in parallel to the stator surface with the aid of the coil arrangements. The movement perpendicular to the stator surface thereby results in a second input option.

In an embodiment of the method, a rotation of the rotor about a first axis in parallel to the stator surface is detected when comparing the position and the expected position. The rotation about the first axis thereby results in a third input option.

In an embodiment of the method, a rotation of the rotor about a second axis perpendicular to the stator surface is detected when comparing the position and the expected position. The rotation about the second axis thereby results in a fourth input option.

The first input option, second input option, third input option and fourth input option may also be used in a parallel manner if corresponding deviations of the position from the expected position are evaluated. In this context, the individual input options may each comprise the position drag error and/or the calculation of the external force acting upon the rotor. Furthermore, any combination of position drag error and/or calculation of the external force acting upon the rotor is conceivable for different input options.

In an embodiment of the method, the external movement is used to energize one or more coil arrangements in such a way that the rotor and/or another rotor performs a predetermined movement. This may be done, for example, in such a way that one rotor may be moved in different directions by an operator and the further rotor is moved in these directions by the energization of the coil arrangements. The rotor thereby serves as a kind of remote control for the further rotor.

In an embodiment of the method, the rotor is first held at a predetermined height with the aid of the interaction between the stator magnetic field and the rotor magnetic field, and the movement of the rotor in parallel to the stator surface along a movement path is carried out as an external movement. Subsequently, the rotor moves along the movement path with the aid of the energization of the coil arrangements. This allows, for example, a complex movement path for the rotor to be entered by an operator without the operator having to have in-depth programming knowledge.

In an embodiment of the method, the external movement of the rotor is used to determine that the rotor is being moved away from the stator surface. Energizing of the coil assemblies takes place in such a way that the rotor is moved toward the stator face and attracted by a magnetic force. This may serve, for example, to protect the rotor from theft, as unauthorized removal of the rotor may be prevented. In this embodiment, in particular, the force acting upon the rotor may be evaluated and the magnetic force attracting the rotor towards the stator surface may be generated only when the force acting upon the rotor determined from the comparison of the position with the expected position exceeds a predetermined value.

When evaluating the force acting upon the rotor determined from the comparison of the position with the expected position, a movement of the rotor towards a stop may also be detected, in which case the contact with the stop may be used as an input.

As an alternative or in addition to input via the rotor, other input units may be provided, as well. For example, input may be made via a touch-sensitive screen, a 6D pen, and/or a sensor system for detecting human behavior, where the sensor system for detecting human behavior may include, for example, a microphone and speech recognition for entering voice commands or a camera with image recognition.

A method for operating the planar drive system in which the rotor may be used as an output device may be carried out as follows. An output is provided by a predetermined movement of the rotor, where the coil arrangements are energized in such a way that the rotor moves as defined by the predetermined movement. Information may be output to an operator by the predetermined movement.

In an embodiment of the method, the predetermined movement of the rotor during output comprises a back-and-forth movement in a direction parallel to the stator surface. This allows for a first output option.

In an embodiment of the method, the predetermined movement of the rotor during output comprises a back-and-forth movement in a direction perpendicular to the stator surface. This allows for a first output option.

In an embodiment of the method, the predetermined movement of the rotor during output comprises a rotational oscillatory movement about a first axis in parallel to the stator surface. This allows for a third output option.

In an embodiment of the method, the rotational oscillation has a frequency such that the rotational oscillation produces an audible sound, in particular a sound in the frequency range between 20 hertz and 20 kilohertz. As a result, the fourth output option may also be an acoustic output option.

In an embodiment of the method, the predetermined movement of the rotor during output includes a rotational oscillatory movement about a second axis perpendicular to the stator surface. This allows for a fifth output option.

As an alternative or in addition to the output via the rotor, further output units may also be provided. For example, the output may take place with the aid of output units arranged on the rotor, such as light signals or loudspeakers, with data transmission and energy transmission from the stator module to the rotor taking place, as the case may be, and the rotor having a corresponding control system. Different light signals, such as different colors, and/or different tones or tone sequences may be used for different outputs.

FIG. 1 shows a planar drive system 1 having six stator modules 10, where the stator modules 10 are arranged in such a way that a rectangle is formed from two to three stator modules 10. Other arrangements of the stator modules 10 are also conceivable, and more or fewer than six stator modules 10 may be arranged.

In the stator module 10 shown above on the right, an interior of the stator module 10 is sketched, where the stator module 10 includes four stator assemblies 11, the four stator assemblies 11 being arranged within a stator module 10 in a two-by-two square arrangement. Furthermore, for two stator assemblies 11, it is shown that the stator assemblies 11 comprise coil arrangements 12, the coil arrangements 12 being shown with different orientations. The coil arrangements 12 are used to generate a stator magnetic field.

In the illustrated embodiment, the coil arrangements 12 are rectangular and elongated coil arrangements 12. In each stator assembly 11 of the stator modules 10, three individual rectangular and elongated coils of a coil arrangement 12 are shown. Likewise, in an embodiment, a different number of individual rectangular and elongated coils could form a coil arrangement 12. In this case, their longitudinal extension is oriented in parallel to one of the edges of the respective stator assembly 11.

Below each of the illustrated coil arrangement 12, further coils are present which have an orientation rotated by 90° with respect to their longitudinal extension. This grid of longitudinally extended and rectangular coils of a coil arrangement 12 may be arranged one above the other several times. In real terms, neither stator assemblies 11 nor coil arrangements 12 are visible, since they are surrounded by a housing of the stator module 10.

The six stator modules 10 form a continuous stator surface 13 above the stator assemblies 11. Furthermore, a rotor 100 is arranged, the rotor having a plurality of magnet units 114 for generating a rotor magnetic field. The coil arrangements 12 may interact with the magnetic units 114 when an appropriate current is applied, thereby moving the rotor 100 within the planar drive system 1 above the stator surface 13. A plane of movement for the rotor 100 is thus defined by the stator surface 13.

The illustration in FIG. 1 is simplified as each stator assembly 11 comprises a plurality of coil arrangements 12 disposed therein, each at 90° with regard to one another, but only one layer of coil arrangements 12 is shown at any one time. The magnet units 114 are arranged circumferentially within the rotor 100 and may interact with each of the coil arrangements 12 to move the rotor 100. In particular, the movements of the rotor may be made in a plane spanned by a first direction 21 and a second direction 22.

Furthermore, a superposition of these movements is possible, so that the rotor 100 may be moved in all directions parallel to the stator surface 13. Furthermore, a further rotor 105 is shown, where the further rotor 105 is constructed analogously to the rotor 100 and thus may also interact with the coil arrangements 12 to generate a movement of the further rotor 105. The arrangement of four stator assemblies 11 within a stator module 10 corresponds to the stator modules 10 for a planar drive system 1 marketed by the applicant under the name XPLANAR. Alternatively, it may be provided to arrange more or fewer stator assemblies 11 within a stator module 10. For example, each stator module 10 may comprise only one stator assembly 11 or may comprise more than four stator assemblies 11.

Also shown in FIG. 1 is a controller 20 that is connected to one of the stator modules 10. It may be provided that the stator modules 10 may pass on communication signals to one another. Alternatively, each stator module 10 may also be connected to the controller 20. The controller 20 is arranged to output control commands to the stator modules

10, where the stator modules 10 are arranged to energize the coil arrangements 12 based on the control signals and thereby control a movement of the rotor 100 in parallel to the stator surface 13. The coil arrangements 12 may further be energized in such a way that the rotor 100 is moved perpendicularly with regard to the stator surface 13.

Further shown in FIG. 1 are magnetic field sensors 14 in one of the stator modules 10, where the other stator modules 10 may also comprise magnetic field sensors 14. With the aid of the magnetic field sensors 14, a position of the rotor 100 or of the further rotor 105 may be determined and transmitted to the controller 20. The magnetic field sensors 14 may, for example, be embodied as Hall sensors, in particular as 3D Hall sensors.

The planar drive system 1 shown in FIG. 1 may be used in automation technology, in particular in manufacturing technology, handling technology and process engineering, to transport objects. In this context, the objects may for example be arranged on the rotor 100.

The rotor 100 may serve as an input device in the planar drive system 1 shown in FIG. 1. In this case, the controller 20 is arranged to compare a position of the rotor magnetic field detected with the aid of a magnetic field sensor 14 with a position expected on the basis of an energization of the coil arrangements 12, and to determine a deviation of the position from the expected position as an external movement, thereby recognizing an input.

In particular, it may be provided that the point of application, direction and magnitude of an external force acting upon the rotor 100 is detected using the described deviation detection. The controller 20 may assign a specific event to the parameters determined in this way. The deviation between the position and the expected position may also be referred to as a position drag error.

The controller 20 may detect the position drag error for each individual axis of movement of each individual rotor 100, 105, where the axes of movement may include linear movements parallel to the first direction 21 and to the second direction 22 and to a third direction perpendicular thereto, and rotations about axes of rotation in parallel to the first direction 21 and to the second direction 22 and to a third direction perpendicular thereto. For example, the magnetic field sensors 14 may be used to determine the position drag error and the rotor magnetic field caused by the magnetic units 114 may be evaluated.

Usually, the goal of a controlled system is to minimize the position drag error. In principle, this may also be implemented in the described planar drive system 1. If a position drag error is detected by the controller, the current set in the coil groups 12 below the relevant rotor 100, 105 is changed. From this current set in the coil groups 12, it is possible to infer the resulting forces and torques on the relevant rotor 100, 105. Thus, the system is not only able to detect an external action upon the rotor via the position drag error. The planar drive system 1 or the controller 20 is thus not only able to determine the position drag error as such, but is also able to determine the amount of the acting force by adjusting the coil currents. The planar drive system 1 or the controller 20 are also set up to determine the direction of the acting force from the aforementioned parameters.

The rotor 100 may serve as an output device in the planar drive system 1 shown in FIG. 1. In this case, the controller 20 is arranged to control an output via a predetermined movement of the rotor 100 and, for this purpose, to energize the coil arrangements 12 in such a way that the rotor 100 moves as defined by the predetermined movement.

FIG. 1 also shows an optional input unit 25, which is connected to the controller 20. As an alternative or in addition to input via the rotor 100, input may also be provided with the aid of the input unit 25. For example, input may be provided via a touch-sensitive screen, a 6D pen, and/or human behavior detection, where the human behavior detection may include, for example, a microphone and voice recognition for inputting voice commands or a camera with image recognition. The touch-sensitive screen, the 6D pen and/or the sensor technology for detecting human behavior may be arranged within the input unit 25.

FIG. 1 additionally shows an optional output unit 26 that is connected to the controller 20. Furthermore, an output unit 26 may also be arranged on the rotor 100. As an alternative or in addition to the output via the rotor 100, an output may also be carried out via the output unit 26. For example, the output may take place with the aid of output units 26 arranged on the rotor 100, such as light signals or loudspeakers, with data transmission and power transmission from the stator module 10 to the rotor 100 taking place, as the case may be, and the rotor 100 having a corresponding controller. Different light signals, such as different colors, and/or different tones or tone sequences may be used for different outputs.

As the case may be, the further figures contain the reference numerals described in connection with FIG. 1. In the further description, as the case may be, these reference numerals will not be further discussed, since the parts of the planar drive system 1 described with these reference numerals were described in connection with FIG. 1.

Figure 2:
FIG. 2 shows a flowchart for recognizing an input.
Figure 2:
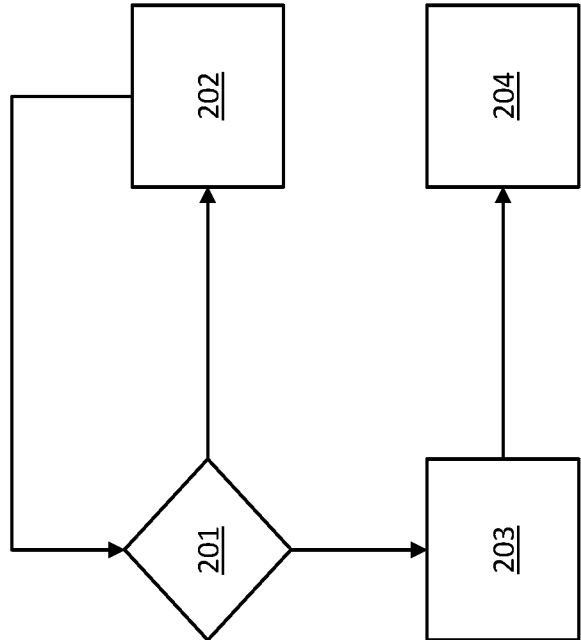

FIG. 2 shows a first flowchart 200 of a method for operating a planar drive system 1, in which an input is detected with the aid of a rotor 100. In a decision step 201, a deviation of the position of the rotor 100 from a position of the rotor 100 expected on the basis of the energization of the coil units 12 is determined. Thus, in the decision step 201 it is particularly determined whether a position of the rotor magnetic field detected with the aid of the magnetic field sensor 14 is compared to a position of the rotor magnetic field expected on the basis of an energization of the coil assemblies 12. If these positions match, a control operation 202 is carried out without input, and the decision step 201 is carried out again after a predetermined time. If, in the decision step 201, the position of the rotor magnetic field detected with the aid of the magnetic field sensor 14 differs from the position of the rotor magnetic field expected on the basis of an energization of the coil arrangements 12, an input is detected in the detection step 203. In an optional reaction step 204, a reaction may then occur, which reaction may be energizing the drive coils 12 in such a way that a particular movement of the rotor 100 is executed.

The deviation of the position from the expected position may thereby comprise a position drag error, i.e. a real deviation of the position. Furthermore, the deviation of the position from the expected position may alternatively or additionally be used to calculate an external force acting upon the rotor 100, if with the aid of the coil arrangements 12 the rotor 100 is held at its position and due to the external movement an additional current is applied to the coil arrangements 12 in order to maintain the position. Conclusions about the external force may then be drawn from the amount of current applied. In particular, this may be done in the decision step 201.

Figure 3:
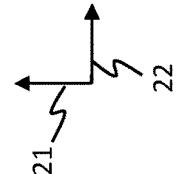
FIG. 3 shows a top view of a planar drive system.
Figure 3:
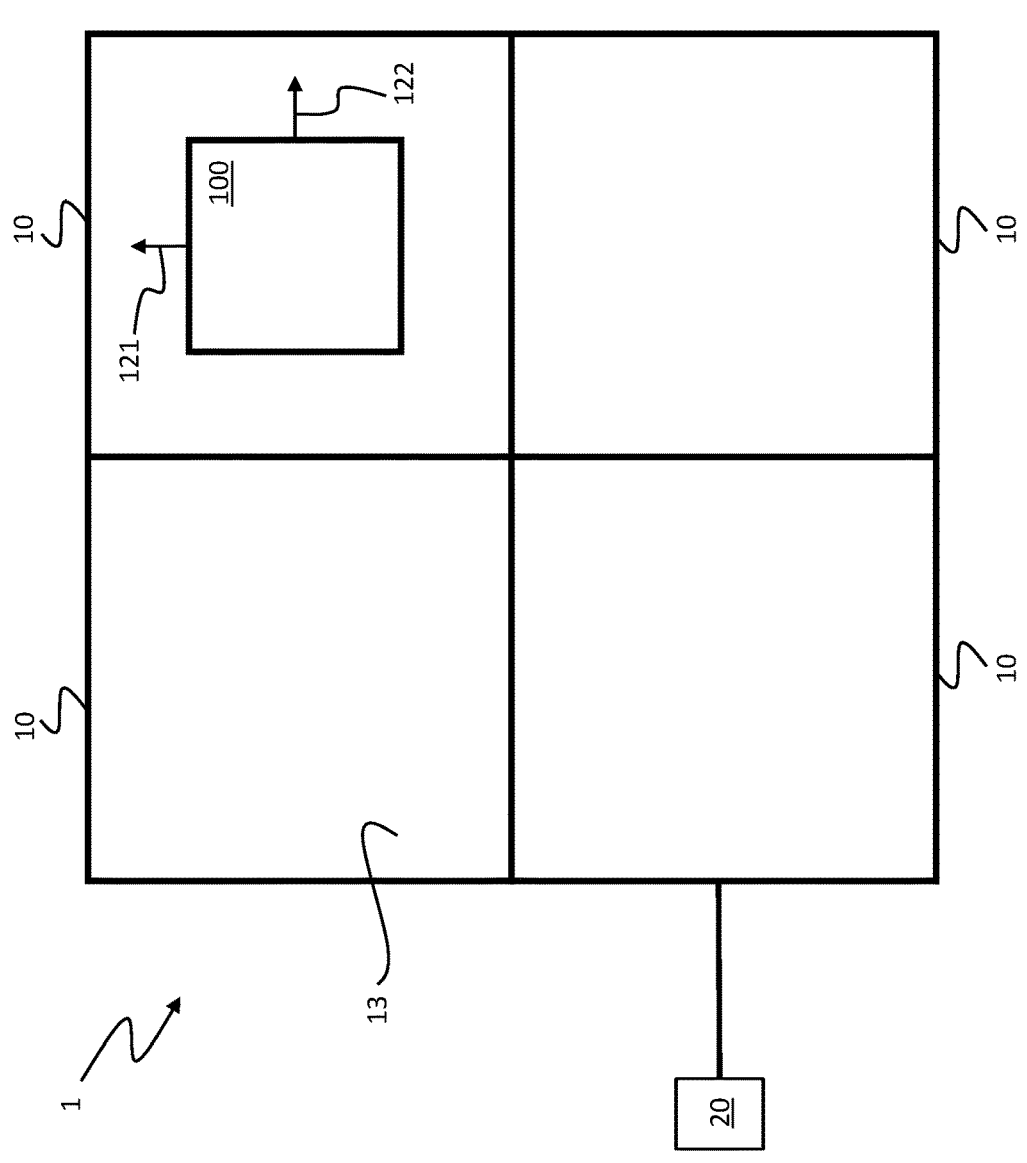

FIG. 3 shows a top view of a planar drive system 1 in which the rotor 100 may be moved in the first direction 21 and in the second direction 22 with the aid of the drive coils 12. The controller 20 is further arranged to detect a position of the rotor magnetic field with the aid of the magnetic field sensors 14 and to compare it to a position expected on the basis of an energization of the coil arrangements 12, and to determine an external movement in a first external direction of movement 121 and in a second external direction of movement 122 from a deviation of the position from the expected position. The first external movement direction 121 is oriented in the same direction as the first direction 21, and the second external movement direction 122 is oriented in the same direction as the second direction 22. The deviation may again be determined as a position drag error or as a force.

Figure 4:
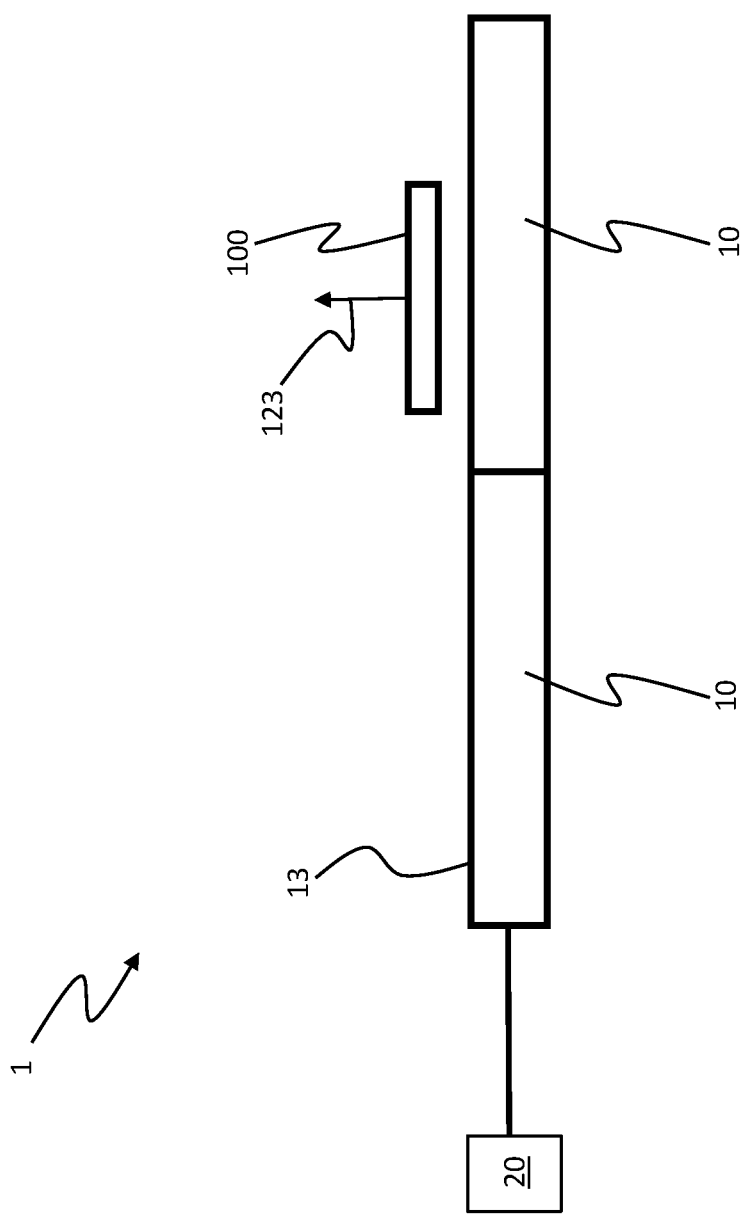
FIG. 4 shows a side view of a planar drive system.

FIG. 4 shows a side view of a planar drive system 1. The controller 20 is again set up to detect a position of the rotor magnetic field with the aid of the magnetic field sensors 14 and to compare it with a position expected on the basis of an energizing of the coil arrangements 12 and to determine an external movement in a third external direction of movement 123 from a deviation of the position from the expected position. The third external direction of movement 123 is oriented in the same direction as a third direction 23 perpendicular to the first direction 21 and second direction 22. The deviation may again be determined as a position drag error or as a force. In this case, the position drag error may be derived directly from a measurement of a position of the magnetic units 114 with the aid of the magnetic field sensors 14. The force may be determined from what current is required to be applied to the coil groups 12 to hold the rotor 100 in position. Thus, a force is then generated with the aid of the coil groups 12 that opposes the external movement.

The embodiments of FIGS. 3 and 4 may also be combined so that inputs triggered by an operator of the planar drive system may be detected as movements of the rotor 100 in the first external direction of movement 121, the second external direction of movement 122 and the third external direction of movement 123. Furthermore, it may be provided that alternatively or additionally, rotational movements of the rotor 100 about an axis parallel to the first direction 21 and/or to the second direction 22 and/or to the third direction 23 are detected and taken as input. This may also be carried out with the aid of the position of the magnetic units 114, determined by the magnetic field sensors 14, if, for example, during a rotation about the axis parallel to the first direction 21, a magnetic unit 114 moves closer to the stator module 10 and a magnetic unit 114 moves away from the stator module 10. Furthermore, the evaluation described above with respect to the force may also take place here, where an additional force is generated on the rotor 100 with the aid of the coil arrangements 12, which force is in the opposite direction to the rotation.

For example, in the third direction 23, a detection of a position drag error may be configured as follows. An operator of the planar drive system presses on the rotor 100 from above, causing the rotor 100 to move against the third external direction of movement 123. The rotor 100 is thus e.g. pushed downwards out of its position, i.e. in the direction of the stator module 10. This is detected as a position deviation or position drag error in the third direction 23. Now the current in the coil groups 12 may be adjusted to bring the rotor 100 back to a target height. This may be done analogously for the first direction 21 and the second direction 22. If the input is in the form of a touch, an adjustment of the current in the coil groups 12 is not required in the long term, since the touch may only last a short time. After touching, a position drag error would again be detected by the adjusted current and the force on the rotor 100, which however is no longer present due to the pressing, and the current in the coil groups 12 would again be adjusted so that the rotor is again brought to the target height.

Alternatively, however, only the short position drag error is detected by the pushing and the current is not adjusted. After the pushing is finished, the rotor 100 is then automatically brought back to the target height by the already previously set current of the coil groups 12.

By detecting an existing position drag error over time, a different long touch, for example, a tap as opposed to a longer press, may be detected, for example. Likewise, the detection may be used to detect whether a rotor 100 has been loaded, for example. If a persistent position drag error occurs that must be compensated for by adjusting the current in the coil groups 12, an event may be associated with this position drag error in conjunction with the timing component, for example that the rotor 100 is loaded.

Alternatively, the set force may also be evaluated. In this case, a set force corresponds to a link between a specific position of the rotor in the first direction 21 and/or the second direction 22 and/or the third direction 23 (or a combination of different positions) and a set current of the coil groups 12 in the area of influence of the rotor 100. For example, an initially empty rotor 100 may be loaded with a product. This results in a position drag error in the third direction 23. A new force is set with the aid of the energization of the coil groups 12.

Thus, as previously described, a short-term position drag error as a result of an input via the rotor 100 as well as a long-term increased set force may be detected and distinguished by evaluating the duration of the change of the current in the coil groups 12. If both are fulfilled, the event "rotor 100 is loaded" may be obtained.

A position drag error in the first direction 21 and/or the second direction 22 and/or the third direction 23 (or a combination of different position drag errors) may then correspondingly also be associated with an event. For example, a position drag error in the second direction 22 may mean that the rotor 100 has been tapped. This detected tapping of the rotor may then be associated with a particular event within the controller 20, as will be described further below by way of example.

The input detection methods presented in FIGS. 2 to 4 may be assigned by the controller 20 to any events that are either stored in the controller 20 or that a machine operator may specify in advance in the controller 20. These events may comprise specific control commands for the rotor 100 or further rotors 105, as well as comprise specific control or program or programming steps within the control program running in the controller 20, as well as trigger specific actions or work processes of further machine elements in connection with the planar drive system 1, but also independently thereof. By way of example, a selection of detected position drag errors and events associated therewith are described below. However, this list is not exhaustive and no fixed assignment of the described position drag errors and the respective event is provided, either. Any combinations and events are conceivable within the scope of the system according to the invention and are covered by the scope of protection.

A position drag error in the third direction, which exceeds a defined limit value, may for example be assigned to the event "rotor 100 was tapped in the center". This event may in turn be associated with a command in the context of human-machine interaction, so as to move the rotor 100 a predetermined distance in a predetermined direction, for example one meter in the first direction 21.

For example, a force acting in the first direction 21 for longer than a predetermined period of time, such as three seconds, may be associated with the event "rotor 100 is pushed". This event may be associated, for example, with the command to "move the rotor 100 in the first direction 21".

A positive position drag error in a rotational axis parallel to the second direction 22 may be associated with the event "rotor 100 was tapped on the right half". This event may be assigned to the command "stop rotor 100", for example, so that the rotor 100 is not subsequently moved further.

A negative position drag error in a rotational axis parallel to the second direction 22 may be associated with the event "rotor 100 was tapped on the left half". The event may, for example, be assigned to the command "Move rotor 100 further".

A force acting permanently (longer than a predetermined period of time, for example three or five seconds) against the third direction 23 may be associated with the event "rotor 100 has been loaded". The event "rotor 100 has been loaded" may be associated with the command "rotor 100 is to be moved to a predetermined position of the planar drive system 1".

Any position drag errors or forces may be assigned to any events, as the case may be in combination with an evaluation of a time duration. The events, in turn, may be assigned to any commands in the human-machine communication. As an input device, the rotor 100 thus becomes a flexibly programmable universal element of this communication.

Figure 5:
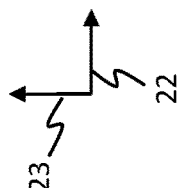
FIG. 5 shows a side view of a planar drive system.
Figure 5:
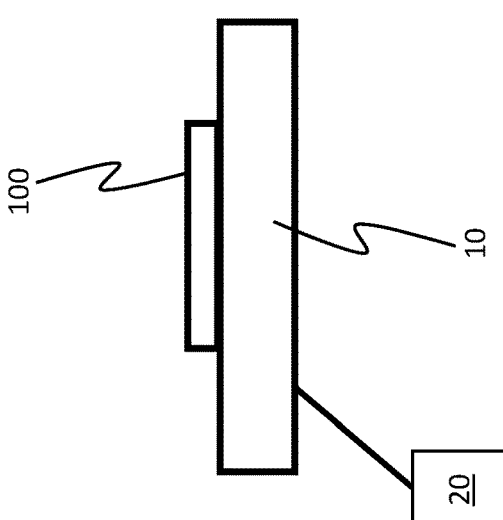
Figure 5:
Figure 5:
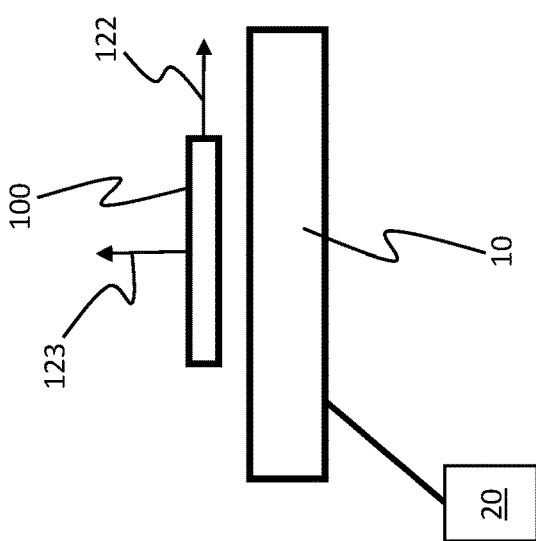
Figure 5:
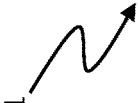

FIG. 5 shows a side view of a planar drive system 1, in which a movement of the rotor 100 in the first external direction of movement 121 and/or the third external direction of movement 123 was detected by the magnetic field sensors 14, which was not caused by an energizing to the coil arrangements 12. A movement in the second external direction of movement 122 may also be detected. It may be provided that this movement is detected as a removal attempt, i.e. that the rotor 100 is to be removed from the planar drive system 1. Then, on the one hand, within the scope of a theft protection, it may be provided that the controller 20 issues control commands to the respective stator module 10 in such a way that the coil arrangements 12 are energized in such a way that the rotor 100 is moved towards the stator module 10 and is attracted by the stator module 10 with a predetermined force, so that a theft may be prevented.

Figure 6:
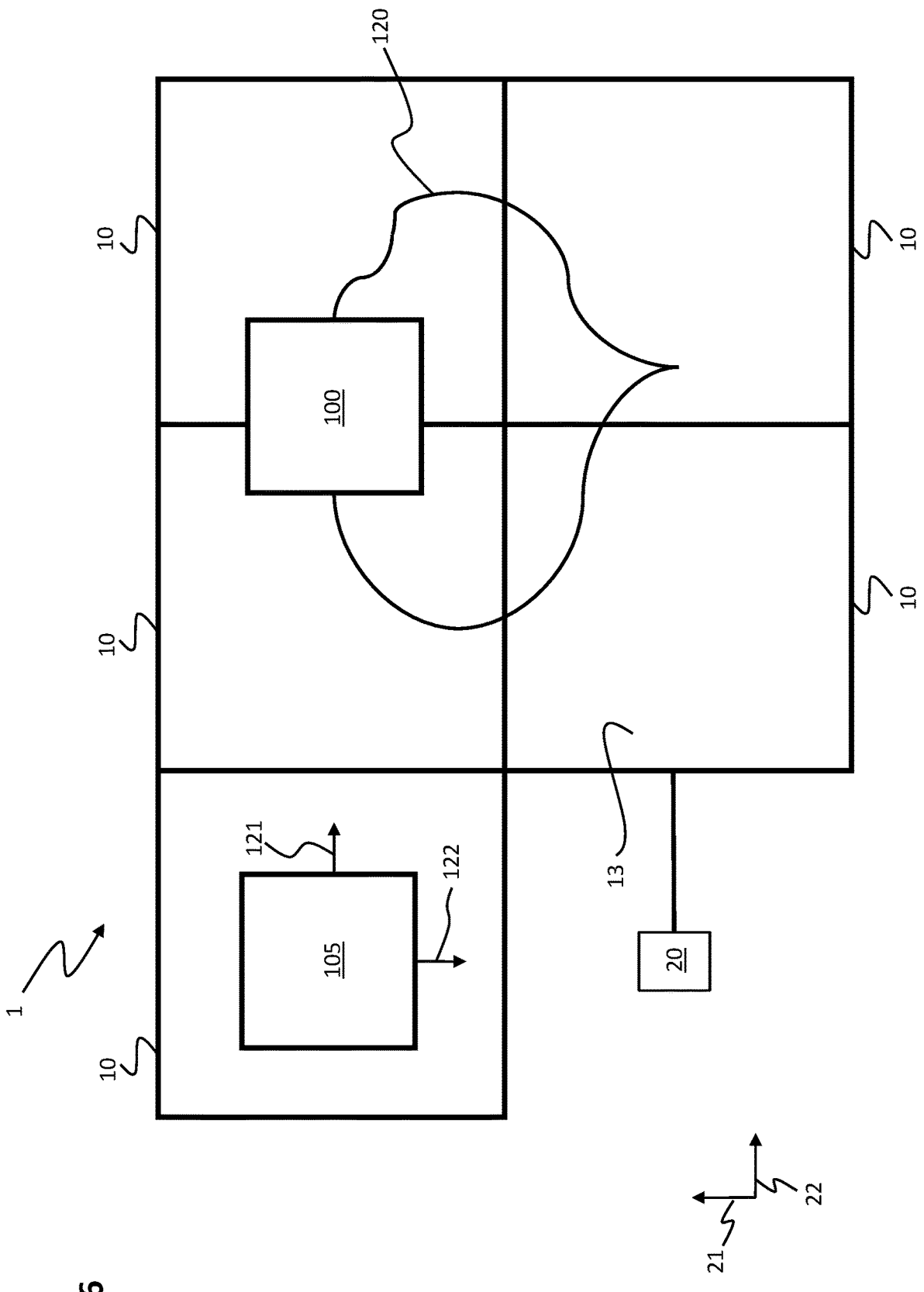
FIG. 6 shows a top view of a planar drive system.

This is indicated on the right in FIG. 6. Alternatively, it may be provided that in operation the rotor 100 is permitted to be removed and the coil arrangements 12 are energized in such a way that the rotor 100 is switched to force-less and may be removed without overcoming a force. It may be provided that the removed rotor is simultaneously logged off from the planar drive system 1 on the software side, so that the controller 20 no longer considers this rotor 100. Both alternatives may be triggered, for example, in reaction step 204.

FIG. 6 shows a top view of a planar drive system 1 that includes the input options of the rotor 100 as an input device described in connection with FIGS. 1 to 4. In this regard, a movement path 120 of the rotor 100 may be recorded as an external input.

This may be done with the possibilities described in connection with FIG. 3, external movements in particular in the first external direction of movement 121 and the second external direction of movement 122. In particular, it may be provided that the coil arrangements 12 are energized in such a way that the rotor 100 is switched to force-less with respect to movements in the first direction 21 and the second direction 22 and floats above the stator surface 13 or lies on the stator surface 13.

Subsequently, the rotor 100 is moved manually and the magnetic field of the magnetic arrangements 114 is determined with the aid of the magnetic field sensors 14 and the path of movement 120 is determined therefrom. Subsequently, the coil arrangements 12 may be energized in such a way that the rotor 100 moves along the path of movement 120. Thus, the rotor 100 is used as an input device for trajectory detection. The rotor 100 used for path detection, as well as any other rotors, may subsequently travel along the path once detected. Switching between path-detecting mode and normal operating mode may be accomplished, for example, by tapping the rotor 100 and may be detected as described above.

Furthermore, FIG. 6 shows an alternative embodiment in which a further rotor 105 may be used as an input device. The further rotor 105 is moved in the first external direction of movement 121 and the second external direction of movement 122 by an operator of the planar drive system 1 in a manner analogous to a joystick, and the input thereby provided may be used to energize the coil arrangements 12 in such a way that the rotor 100 is moved along the path of movement 120.

It is also possible that an external movement of the rotor 100 or of the further rotor 105 in the first external direction of movement 121 and/or in the second external direction of movement 122 and/or the third external direction of movement 123 is detected, thereby triggering a predetermined movement of the rotor 100 with the aid of energizing the coil arrangements 12.

Figure 7:
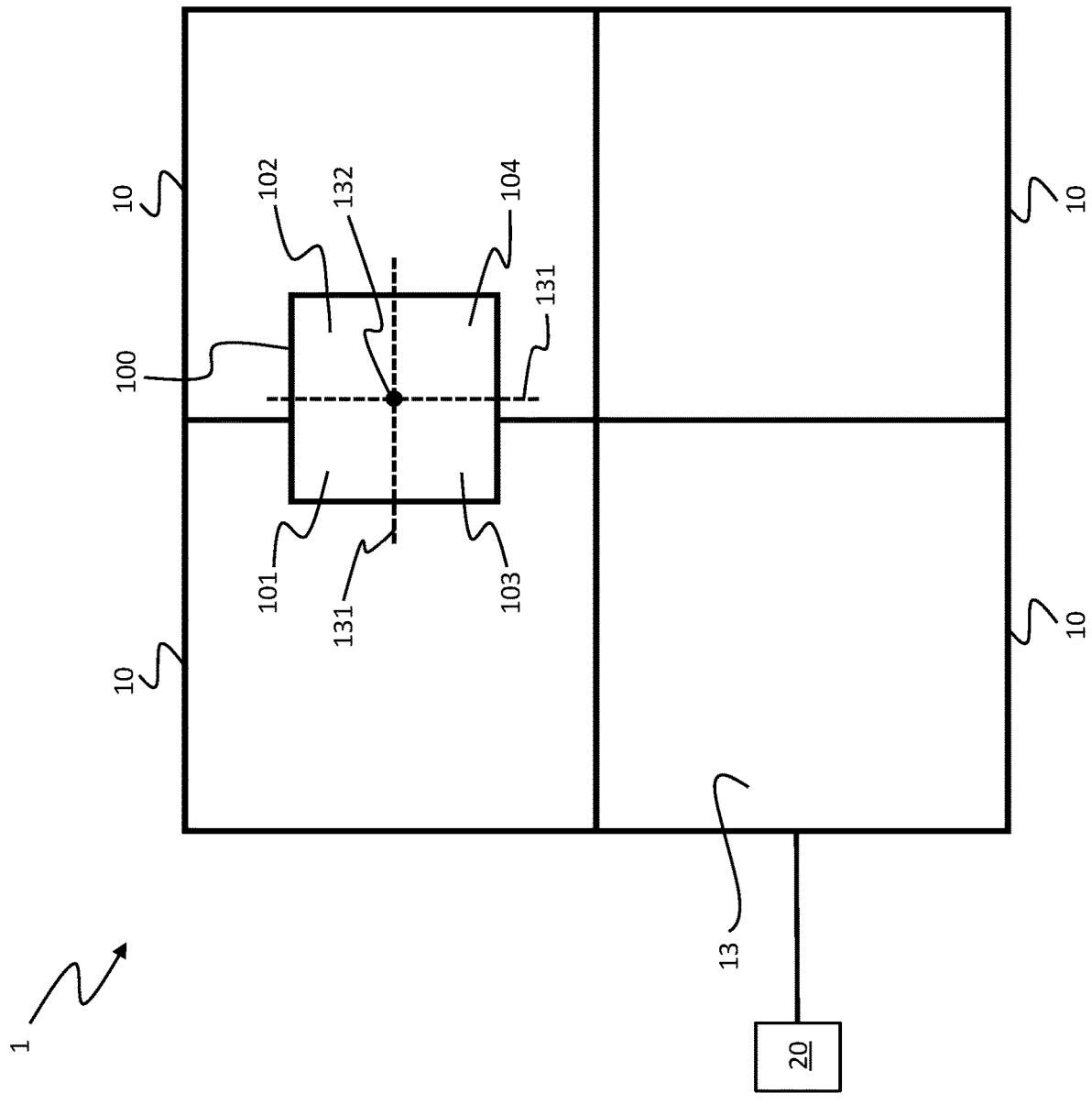
FIG. 7 shows a top view of a planar drive system.

FIG. 7 shows a top view of a planar drive system 1 that includes further input options of the rotor 100. If the rotor 100 is arranged above the stator surface 13, external input may be provided by rotating the rotor 100 about a first axis 131, where the first axis 131 is in parallel to the stator surface 13 and thus two first axes 131 are defined for a rotor 100.

Even a rotation by a few degrees about the first axis 131 may be detected with the aid of the magnetic field sensors 14 and identified as an external input, in particular if the energization of the coil groups 12 is such that the rotor 100 is aligned in parallel to the stator surface 13. In this regard, it may be provided, for example, that the rotor 100 comprises a first quadrant 101, a second quadrant 102, a third quadrant 103, and a fourth quadrant 104, where tapping the rotor 100 in each of the first to fourth quadrants 101, 102, 103, 104 triggers a different rotation about the first axes 131, and thus four different inputs are possible. For example, a tap in the first quadrant 101 may be taken as an input that the rotor 100 is to move to a first predetermined position in the planar drive system 1 and the coil arrangements 12 are energized accordingly.

A tap in the second quadrant 102 may be understood, for example, as an input that the rotor 100 is to move to a second predetermined position in the planar drive system 1 and the coil arrangements 12 are energized accordingly. A tap in the third quadrant 103 may be taken, for example, as an input that the rotor 100 is to travel a predetermined distance in a predetermined direction and the coil arrangements 12 are energized accordingly. A tap in the fourth quadrant 104 may, for example, be taken as an input that the rotor 100 is to carry out a further predetermined movement and the coil arrangements 12 are energized accordingly. Of course, predetermined movements beyond this are possible, as well. The movements may be controlled accordingly during the reaction step.

Also shown in FIG. 7 is a second axis 132 perpendicular to the stator surface 13. Rotation of the rotor 100 about the second axis 132, which has not been initiated by energizing the coil arrangements 12, may also be taken as an input and processed according to the methods described.

The inputs described in connection with FIGS. 6 and 7 may be combined, for example, by first activating the mode described in connection with FIG. 6 with a tap of one of the first to fourth quadrants 101, 102, 103, 104 or with a central tap of the rotor 100 and then energizing the coil arrangements 12 in such a way that the rotor 100 is switched to forceless with respect to movements in the first direction 21 and the second direction 22 and hovers above the stator surface 13 or lies on the stator surface 13. Now the rotor 100 may serve as an input device for inputting the movement path 120 and then the mode described in connection with FIG. 6 may be deactivated with a further tap of one of the first to fourth quadrants 101, 102, 103, 104 or with a central tap of the rotor 100. Subsequently, the rotor 100 may be moved again in the first direction 21 and/or the second direction 22 with the aid of energizing the coil groups 12. The mode described in connection with FIG. 6 may be referred to, for example, as a teach-in mode.

By the input methods described in connection with FIGS. 3 to 7 using a rotor 100, 105 of the planar drive system as an input device, it is possible to control movements of the rotor 100 without having to write program code for the controller 20 for this purpose. This simplifies the operation of the planar drive system 1, since the rotors 100 of the planar drive system 1 may be controlled, for example, by intuitive gestures or actions of the machine operator.

Figure 8:
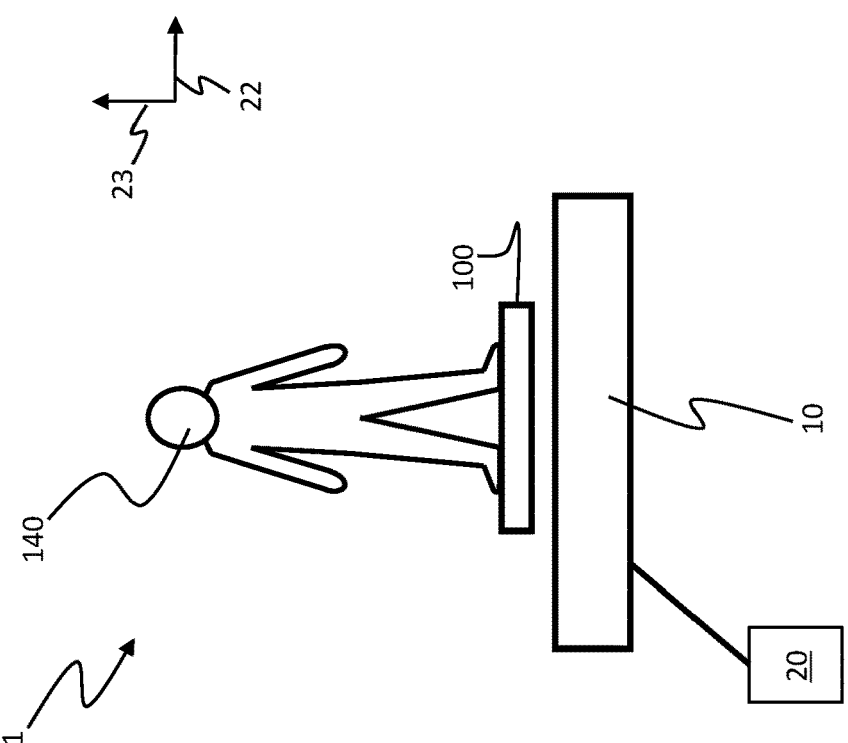
FIG. 8 shows a side view of a planar drive system.
Figure 8:
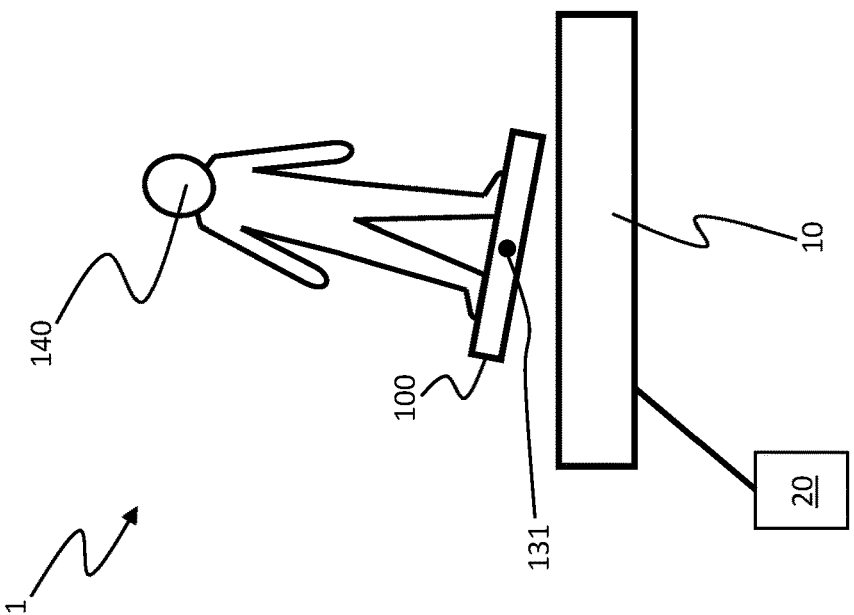

FIG. 8 shows a side view of a planar drive system 1 in which the rotor 100 may be used to transport a person 140. In particular, this means that the interaction between the rotor magnetic field and the drive magnetic field is large enough to support the weight of the person 140. The person 140 may control the rotor 100 by shifting their weight.

In the left section of FIG. 8, the person 140 is shown with their weight shifted to the right so that the rotor 100 is tilted to the right and thus rotated a few degrees about a first axis 131. This may be detected as a discrepancy between the position determined with the aid of the magnetic field sensors 14 and the position of the rotor 100 expected from energizing the coil arrangements 12, using the methods already described as an input. In this regard, the input may include a signal that the rotor 100 is to move to the right, i.e., in the direction of the weight shift of the person 140, and that the coil arrangements 12 are to be energized accordingly. In the event that a plurality of rotors 100 is provided, provision may further be made to control the energization of the coil arrangements 12 in such a way that collisions of the rotors 100 are precluded, in particular collisions of multiple rotors 100 with persons 140 are precluded.

Figure 9:
FIG. 9 shows a flowchart for carrying out an output.
Figure 9:
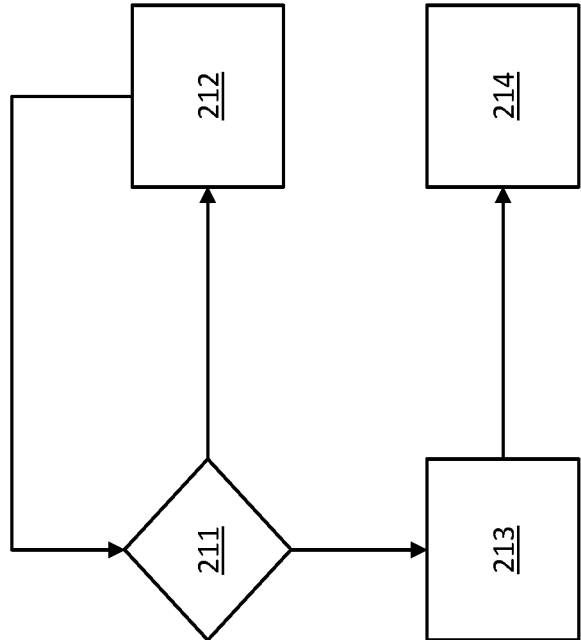

FIG. 9 shows a second flowchart 210 of a method for operating a planar drive system 1 in which an output is made with the aid of a rotor 100. In a further decision step 211, it is determined that an output is to occur. This may be the case, for example, if a product transported on the rotor 100 is detected as damaged, for example with the aid of cameras. If no output is to take place, a further control operation 212 is carried out without output and, after a predetermined time, the further decision step 211 is carried out again. In the output step 213, the output is carried out by energizing the coil arrangements 12 in such a way that the rotor 100 carries out a predetermined movement. In an optional further reaction step 214, a reaction may then be performed, the reaction being an additional energization of the drive coils 12 such that a predetermined movement of the rotor 100 is carried out. This may be used, for example, when a defective product is first to be signaled and then to be discharged from the production process with the aid of the rotor 100.

Figure 10:
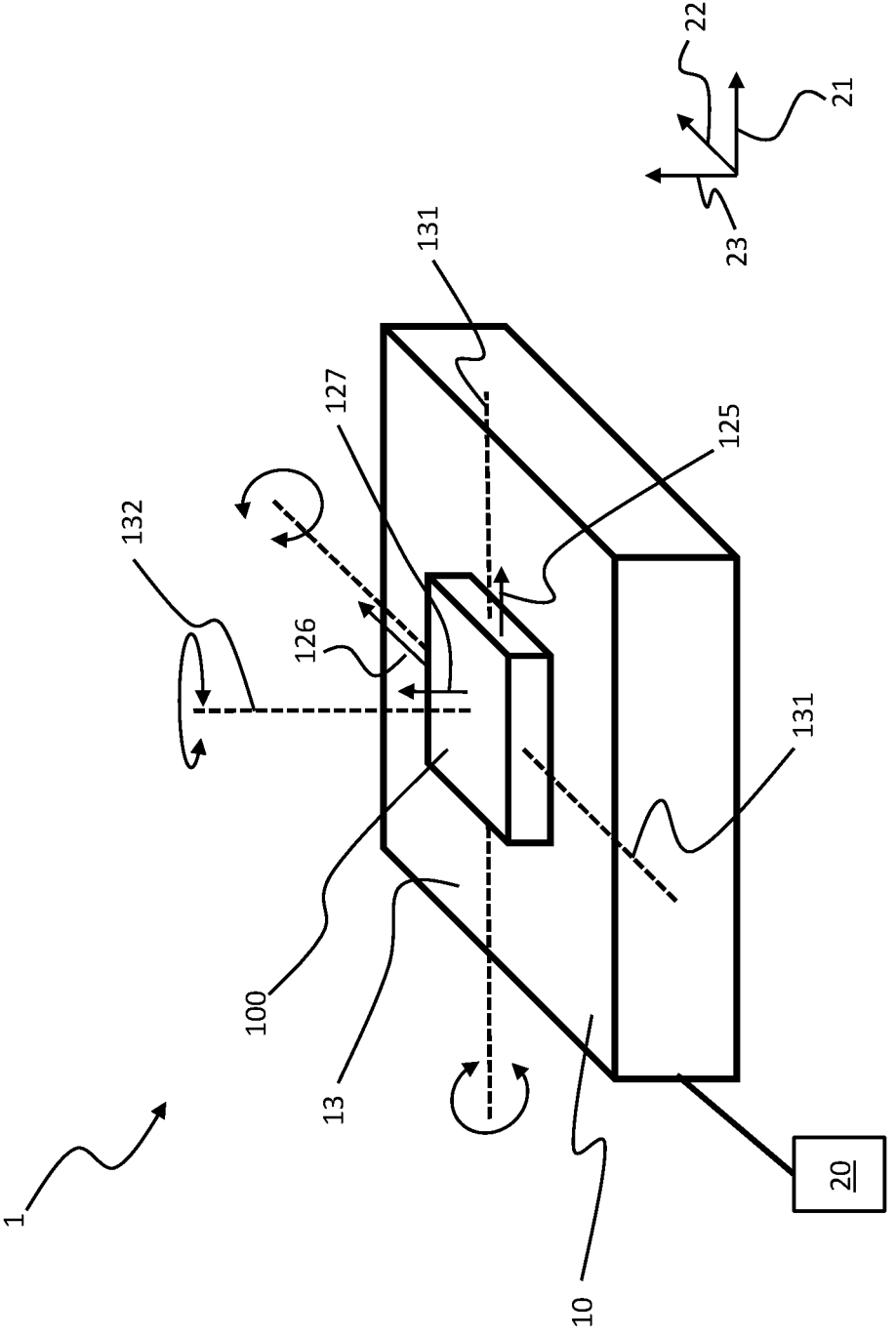
FIG. 10 shows an isometric view of a planar drive system.

FIG. 10 shows an isometric view of a planar drive system 1 in which the output step 213 is carried out. It may be provided that the output is carried out by moving the rotor 100 in parallel to the stator surface 13, i.e. in a first direction of movement 125 parallel to the first direction 21 and/or in a second direction of movement 126 parallel to the second direction 22. Also possible are movements comprising a superposition of the first direction of movement 125 and the second direction of movement 126.

In particular, the predetermined movement of the rotor 100 during the output may be a back-and-forth movement in a direction parallel to the stator surface 13, that is, in the first direction 21 or the second direction 22 or a superposition of the first direction 21 and of the second direction 22. As an alternative or in addition, the output may be provided by moving the rotor 100 perpendicular to the stator surface 13, that is, in a third direction of movement 127 parallel to the third direction 23. In particular, it may be provided that this movement of the rotor 100 in the output is a back-and-forth movement in the third direction 23 perpendicular to the stator surface 13.

As an alternative or in addition, it may be provided that the predetermined movement of the rotor 100 at the output comprises a rotational oscillatory movement about a first axis 131 in parallel to the stator surface 13. As an alternative or in addition, it may be provided that the predetermined movement of the rotor 100 at the output comprises a rotational oscillatory movement about a second axis 132 perpendicular to the stator surface 13. These movements may each be visually perceived by an operator.

All movements of the rotor 100 as an output device executed in such a way may be defined in terms of a convention for machine-human communication as signaling of a certain state. Thus, the output includes the signaling of the state. The facts, i.e., the link of a particular event within the control sequence and/or a particular state of the planar drive system or its components may either be stored in the controller 20 or a machine operator may specify this link in advance in the controller 20.

For example, a movement of the rotor 100 in the third direction 23 alternately upward, i.e., away from the stator modules 10, and downward, i.e., toward the stator modules 10, may indicate that this rotor 100 should not be loaded. A back-and-forth movement of the rotor 100 in the first direction 21 and/or the second direction 22 may include outputting an error message for that rotor. For example, a movement of the rotor 100 in a circle may mean that a cleaning of the rotor 100 should be performed.

Figure 11:
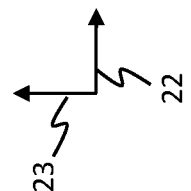
FIG. 11 shows a side view of a planar drive system.
Figure 11:
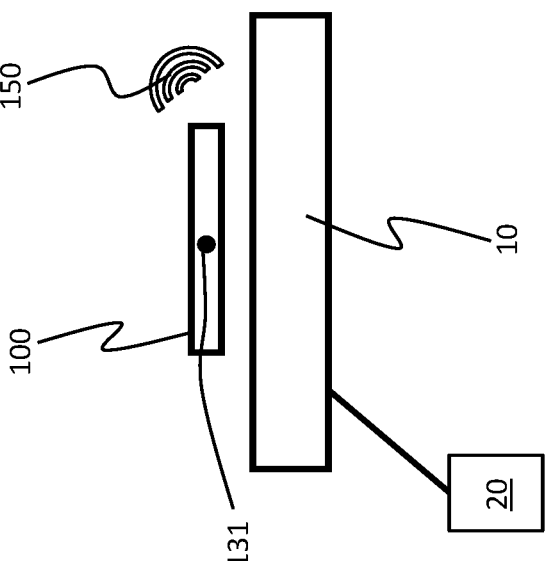
Figure 11:
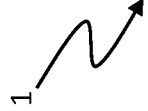

FIG. 11 shows a side view of a planar drive system 1, in which an output takes place with the aid of the rotational oscillatory movement about the first axis 131, the rotational oscillation having a frequency such that an audible sound, in particular a sound in the frequency range between 20 hertz and 20 kilohertz, is produced by the rotational oscillation. This tone may then be output as sound waves 150. Thus, an acoustic output is possible. With the aid of the acoustic output, certain facts may likewise be signaled in the sense of a convention for machine-human communication. In particular, it may be provided that the coil groups 12 are energized in such a way that the resulting rotational oscillatory movement generates sound waves 150.

This invention has been described with respect to exemplary embodiments. It is understood that changes can be made and equivalents can be substituted to adapt these disclosures to different materials and situations, while remaining with the scope of the invention. The invention is thus not limited to the particular examples that are disclosed, but encompasses all the embodiments that fall within the scope of the claims.

TABLE 1

| List of reference numerals |
| --- |
| 1 shows planar drive system |
| 10 shows stator module |
| 11 shows stator assembly |
| 12 shows coil arrangement |
| 13 shows stator surface |
| 14 shows mangetic field sensor |
| 20 shows controller |
| 21 shows first direction |
| 22 shows second direction |
| 23 shows third direction |
| 25 shows input unit |
| 26 shows output unit |
| 100 shows rotor |
| 101 shows first quadrant |
| 102 shows second quadrant |
| 103 shows third quadrant |
| 104 shows fourth quadrant |
| 105 shows further rotor |
| 114 shows magnetic unit |
| 120 shows path of movement |
| 121 shows first external direction of movement |
| 122 shows second external direction of movement |
| 123 shows third external direction of movement |
| 125 shows first direction of movement |
| 126 shows second direction of movement |
| 127 shows third direction of movement |
| 131 shows first axis |
| 132 shows second axis |
| 140 shows person |
| 150 shows sound waves |
| 200 shows first flowchart |
| 201 shows decision step |
| 202 shows control mode |
| 203 shows detection step |
| 204 shows reaction step |
| 210 shows second flowchart |
| 211 shows further decision step |
| 212 shows further control mode |
| 213 shows output step |
| 214 shows further reaction step |

What is claimed is:

1. A method for operating a planar drive system, the planar drive system comprising:

at least a stator module and a rotor, the stator module comprising at least a stator assembly having at least a coil arrangement, wherein the coil arrangement is energized and is configured to generate a stator magnetic field above a stator surface due to energization of the coil arrangement, wherein the stator module comprises at least a magnetic field sensor, and wherein the rotor comprises a magnet arrangement and is movable above the stator surface with the aid of an interaction between the stator magnetic field and a rotor magnetic field of the magnet arrangement;

wherein the rotor is used as an input device, wherein an input is detected by detecting a position of the rotor magnetic field with the aid of the magnetic field sensor and comparing said position of the rotor magnetic field to a position expected based on the energization of the coil arrangement, and wherein a deviation of the position from the expected position is evaluated as a position drag error and detected over time, wherein the position drag error is determined as an external movement in combination with the respective time duration and is assigned to a predetermined input event.

2. The method according to claim 1, wherein a movement parallel to the stator surface is detected when comparing the position and the expected position.

3. The method according to claim 1, wherein a movement perpendicular to the stator surface is detected when comparing the position and the expected position.

4. The method according to claim 1, wherein a rotation of the rotor about a first axis in parallel to the stator surface is detected when comparing the position and the expected position.

5. The method according to claim 1, wherein a rotation of the rotor about a second axis perpendicular to the stator surface is detected when comparing the position and the expected position.

6. The method according to claim 1, wherein the external movement is used to energize one or more instances of said coil arrangement in such a way that the rotor and/or a further rotor carries out a predetermined movement.

7. The method according to claim 6, wherein:

at first the rotor is held at a predetermined height with the aid of the interaction between the stator magnetic field and the rotor magnetic field, and the movement of the rotor in parallel to the stator surface along a movement path is carried out as an external movement, and the rotor is then movable along the movement path with the aid of the energization of the coil arrangement.

8. The method according to claim 6, wherein the external movement of the rotor is used to determine that the rotor is being removed from the stator surface, wherein the energization of the coil arrangement is such that the rotor is moved toward the stator surface and is attracted by a magnetic force.

9. The method according to claim 6, wherein the external movement of the rotor is used to determine that the rotor is being removed from the stator surface, wherein the energization of the coil arrangement is such that the rotor is forcelessly switched in a first direction, a second direction, and a third direction.

10. A method for operating a planar drive system, the planar drive system comprising:

at least a stator module and a rotor, the stator module comprising at least a stator assembly having at least a coil arrangement, wherein the coil arrangement is energized and is configured to generate a stator magnetic field above a stator surface due to an energization, wherein the stator module comprises at least a magnetic field sensor, and wherein the rotor comprises a magnet arrangement and is movable above the stator surface with the aid of an interaction between the stator magnetic field and a rotor magnetic field of the magnet arrangement;

wherein the rotor is used as an output device, wherein an output is provided via a predetermined movement of the rotor, and wherein the coil arrangement is energized in such a way that the rotor moves as defined by the predetermined movement.

11. The method according to claim 10, wherein the predetermined movement of the rotor during the output comprises a back-and-forth movement in a direction parallel to the stator surface.

12. The method according to claim 10, wherein the predetermined movement of the rotor during the output comprises a back-and-forth movement in a direction perpendicular to the stator surface.

13. The method according to claim 10, wherein the predetermined movement of the rotor in the output comprises a rotational oscillatory movement about a first axis parallel to the stator surface.

14. The method according to claim 13, wherein the rotational oscillation comprises a frequency such that the rotational oscillation produces an audible sound, particularly a sound in the frequency range between 20 hertz and 20 kilohertz.

15. The method according to claim 10, wherein the predetermined movement of the rotor in the output comprises a rotational oscillatory movement about a second axis perpendicular to the stator surface.

16. A method for operating a planar drive system, the planar drive system comprising:

at least a stator module and a rotor, the stator module comprising at least a stator assembly having at least one coil arrangement, the coil arrangement being energizable and being configured to generate a stator magnetic field above a stator surface due to energization of the coil arrangement, wherein the rotor comprises a magnet arrangement and is movable above the stator surface with the aid of an interaction between the stator magnetic field and a rotor magnetic field of the magnet arrangement, and wherein the stator module comprises at least a magnetic field sensor, the magnetic field sensor detecting the rotor magnetic field in order to determine the position of the rotor;

wherein the rotor is used as an input device, wherein an input is detected such that an amount of an additional energization of the coil arrangement, which is carried out in order to maintain the position of the rotor to be expected due to the energization of the coil arrangement, is determined and evaluated as an external force and detected over time, and wherein the external force is evaluated as an external movement in combination with the respective time duration and is assigned to a predetermined input event.

* * * * *